United States Patent [19]

Lee et al.

[11] Patent Number: 5,625,356
[45] Date of Patent: Apr. 29, 1997

[54] METHOD FOR RE-SYNCHRONIZING VARIABLE LENGTH CODE AT HIGH SPEED USING PARALLEL-PROCESSING PATTERN MATCHING

[75] Inventors: Sang H. Lee; Jong S. Youn, both of Seoul, Rep. of Korea

[73] Assignee: Korea Telecommunication Authority, Rep. of Korea

[21] Appl. No.: 395,713

[22] Filed: Feb. 28, 1995

[30] Foreign Application Priority Data

Feb. 28, 1994 [KR] Rep. of Korea .................. 94-3769

[51] Int. Cl.⁶ .................. H04L 1/00; H04L 7/00
[52] U.S. Cl. .................. 341/67; 341/94
[58] Field of Search .................. 341/67, 63, 94

[56] References Cited

U.S. PATENT DOCUMENTS

3,971,888  7/1976  Ching et al. .................. 178/69.5
5,204,859  4/1993  Paesler et al. .................. 370/105.1
5,299,236  3/1994  Pandula .................. 375/116

*Primary Examiner*—Jeffrey A. Gaffin
*Assistant Examiner*—Peguy JeanPierre
*Attorney, Agent, or Firm*—Merchant, Gould, Smith, Edell, Welter & Schmidt

[57] ABSTRACT

A method for re-synchronizing a variable length code at a high speed by comparing an input bit string with a plurality of synchronous code patterns in a parallel manner using a parallel-processing pattern matching algorithm when a transmission error is involved in the variable length code received in a variable length decoder used in systems using digital signals requiring a fixed length code pattern, such as broad band-integrated service digital network (B-ISDN) terminal, high definition TV, digital TV, multimedia, video TAX, facsimile and etc..

8 Claims, 9 Drawing Sheets

| j | 1 2 3 4 5 6 7 8 9 10 11 12 13 14 15 16 ... | Pattern Matching |
|---|---|---|
| S(t)<br>PAT | c d a f g c a b c   a   b   c   a   c   a   b ...<br>a b c a b c a c a b | X |
| S(t+1)<br>PAT | d a f g c a b c a   b   c   a   c   a   b ...<br>a b c a b c a c a b | X |
| : | | |
| S(t+5)<br>PAT | c a b c a b c a c   a   b ...<br>a b c a b c a c a b | X |
| S(t+6)<br>PAT | c b c a b c a c a   b ...<br>a b c a b c a c a b | O |

Fig. 1      Prior Art

| j | 1 2 3 4 5 6 7 8 9 10 11 12 13 14 15 16 ... | Pattern Matching |
|---|---|---|
| S(t)<br>PAT | c d a f g c <u>a b c</u> <u>a</u>   b   c   a   c   a   b ...<br><u>a b c</u> <u>a</u> b c a c a b | X |
| S(t+1)<br>PAT | d a f g c a b c a   b   c   a   c   a   b ...<br>a b c a b c a c a b | O |

Fig. 2

| j | 1 2 3 4 5 6 7 8 9 10 | Foward Matching Times | Reverse Matching Times |
|---|---|---|---|
| S(t)<br>PAT | <u>b</u> b c a a c a d <u>a b</u><br><u>a b</u> c a b c a c f <u>b</u> | 2 | 1 |
| S(t+1)<br>PAT | <u>f b</u> a d g c <u>a b c a</u><br><u>a b c</u> a b c a c <u>f b</u> | ④ | 2 |
| S(t+2)<br>PAT | b c <u>a c f b</u> a d c <u>a</u><br>a b c <u>a b c a c f b</u> | 1 | ⑥ |
| S(t+3)<br>PAT | <u>a b c a b c a c f b</u><br><u>a b c a b c a c f b</u> | ⑩ | ⑩ |

S = 'b,b,c,a,a,c,a,d,a,b,f,b,a,d,g,c,a,b,c,a,b,c,a,c,f,b,a,d,c,a,a,b,c,a,c,f,b'

PAT = 'a,b,c,a,b,c,a,c,f,b'

| Input Bit Stream | | Match Pattern | |
|---|---|---|---|
| $a_0\ a_1\ a_2 \ldots a_{22}\ a_{23} \ldots a_{29}\ a_{30}\ a_{31}$ | | $m_k$ | |
| 0 0 0 ... 0 1 0 | | $m_0 = \overline{a_0}a_1 \ldots \overline{a_{22}}a_{23}$ | |
| | | $m_1 = a_1a_2 \ldots \overline{a_{22}}a_{23}$ | |
| | | $m_2 = a_2a_3 \ldots \overline{a_{22}}a_{23}$ | |
| | | ... | |
| | | $m_{13} = \overline{a_{13}}\overline{a_{14}} \ldots \overline{a_{22}}a_{23}$ | |
| | | $m_{14} = \overline{a_{14}}\overline{a_{15}} \ldots \overline{a_{22}}a_{23}$ | |
| | | $m_{15} = \overline{a_{15}}\overline{a_{16}} \ldots \overline{a_{22}}a_{23}$ | |

| Match Pattern | | | | | | | | | Shift Length | | | | | |
|---|---|---|---|---|---|---|---|---|---|---|---|---|---|---|
| $m_0$ | $m_1$ | $m_2$ | $m_3$ | ... | $m_{13}$ | $m_{14}$ | $m_{15}$ | | S4 | S3 | S2 | S1 | S0 | |
| 1 | x | x | x | | x | x | x | | 0 | 0 | 0 | 0 | 1 | |
| 0 | 1 | x | x | | x | x | x | | 0 | 0 | 0 | 1 | 0 | |
| 0 | 0 | 1 | x | | x | x | x | | 0 | 0 | 0 | 1 | 1 | |
| 0 | 0 | 0 | 1 | | x | x | x | | 0 | 0 | 1 | 0 | 0 | |
| ... | | | | | | | | | ... | | | | | |
| 0 | 0 | 0 | 0 | | 1 | x | x | | 0 | 1 | 1 | 1 | 0 | |
| 0 | 0 | 0 | 0 | | 0 | 1 | x | | 0 | 1 | 1 | 1 | 1 | |
| 0 | 0 | 0 | 0 | | 0 | 0 | 1 | | 1 | 0 | 0 | 0 | 0 | |

METHOD FOR RE-SYNCHRONIZING VARIABLE LENGTH CODE AT HIGH SPEED USING PARALLEL-PROCESSING PATTERN MATCHING

BACKGROUND OF THE INVENTION

1. Field of the Invention

The present invention relates to a method for re-synchronizing a variable length code at a high speed using a parallel-processing pattern matching when a transmission error is involved in the variable length code received in a variable length decoder used in broad band-integrated service digital network (B-ISDN) terminal, high definition TV, digital TV, multimedia, Videotex, facsimile and etc..

2. Description of the Prior Art

Currently, all of data having statistical redundancy are transmitted under a condition that they are compressed using variable length codes in order to achieve a maximized transmission efficiency. However, such variable length codes may cause delay of a transmission error involved therein. Where a transmission error is involved in a variable length code, a synchronous code having a fixed length is additionally used in order to minimize the propagation of the transmission error.

Variable length codes are made by allocating a small amount of bits to symbols of high generation rate while allocating a large amount of bits to symbols of low generation rate in accordance with the statistical distribution of the symbols to be coded. Use of variable length coding results in an effective bit rate reduction, as compared to use of fixed length coding. As the variable length codes remove the statistical redundancy of data, it can reduce greatly a large quantity of video and audio data being transmitted via a transmission medium or stored in a recording medium.

However, the variable length coding has the following disadvantages. First, when a bit string with variable length codes is decoded, it is decoded in the form of symbols having different lengths depending on the statistical distribution of the symbols. For this reason, the decoder used to decode the bit string has an increased complexity in hardware. Second, where a transmission error is generated, the code string is decoded in the form of codes having lengths other than those of the original codes to be transmitted. The transmission error affects next codes continuously until the decoder recognizes this transmission error.

The variable length coder adds a synchronous code having a fixed length to a variable length code in order to prevent any data processing delay caused by the transmission error. On the other hand, the variable length decoder searches the synchronous code upon recognizing the transmission error involved in the variable length code and thereby carries out a re-synchronization with the variable length code. In the case of the shift from one channel to another channel, the variable length decoder requires the operation of the re-synchronization with the variable length code. Once the variable length decoder achieves the re-synchronization with variable length codes, the variable length codes can be correctly decoded. Where a processing at high speed is required as in B-ISDN terminal and multimedia, the high speed re-synchronization algorithm enables the decoder to rapidly deal with the transmission error.

Existing sequential pattern matching algorithm is unsuitable for a direct application to systems requiring a high processing speed such as B-ISDN terminal, high definition TV and multimedia because its processing speed is low. This problem will now be described in conjunction with FIG. 1. The input bit string S(t) is compared with the synchronous code pattern PAT. Where the input bit string S(t) does not accord with the synchronous code pattern PAT, it is shifted one bit. Thereafter, the shifted input bit string S(t+1) is compared with the synchronous code pattern PAT. Where the input bit string S(t+1) does not accord with the synchronous code pattern PAT, it is shifted one bit again. In such a manner, the input bit string S(t+n) is repeatedly compared to the synchronous code pattern PAT and then shifted until they accord with each other.

Where the input bit string, namely, character string S is assumed to be "s1, s2, s3, ... si−1, si, si+1, si+2, ... sL" and the match pattern PAT to be found from the character string S is assumed to be "p1, p2, p3, p4, ... pn" (n<L). "si+1" of the character string S is compared with "p1" of the match pattern PAT. If "si+1" to "si+3" accord with "p1" to "p3", respectively, while "si+4" does not accord with "p4", it is regarded that the pattern matching has been failed. In this case, the founding of the match pattern PAT is begun from "si+2" of the character string S again. That is, "si+2" is compared with "p1". After this procedure is repeated for all characters of the character string S, the match pattern PAT is shifted by "L−n+1" for the pattern matching. Assuming that the number of comparing operations for one time shift is K, the value K corresponds to "1" when the first patterns being compared with each other, namely, "p1" and "si+1" are different from each other. In the worst case, namely, the case wherein the character string S does not accord with "pn" of the match pattern PAT while according with the match pattern PAT up to "pn−1", the value K is "n". In the above-mentioned case, the value K is 3 because the character string S and match pattern PAT accord with each other up to "si+3" and "p3". Accordingly, the range of the value K can be expressed as follows:

$$1 \leq K \leq n$$

Therefore, the number of total operations can be calculated by the following equation (1):

$$= \sum_{i=1}^{L-n+1} (L-n+1) \times K(i) \quad (1)$$

The value K is dependant on the characteristic of character string to be compared. If the character string is the binary random bit string, the mean value of K's can be expressed by the following equation (2):

$$E(K) = \sum_{t=1}^{n} * (1/2)^t \times t \quad (2)$$

By referring to the above equation, it can be found that the value K is reduced in increase degree as the value t is increased. If the value n is infinite ($\infty$), the mean value of K's is "2". In accordance with the former algorithm, the character string S should be compared from "si+2" thereof with "p1" of the match pattern PAT. This algorithm also has the disadvantage of controlling the buffer stored with the character string S in terms of hardware.

The latter algorithm has the advantage that a desired match pattern PAT can be rapidly found out from the character string S. In accordance with this algorithm, it is possible to easily control the buffer stored with the character string S in terms of hardware. The basic concept of this algorithm is as follows.

Where "si+5" does not accord with "p5" while "si+1" to "si+4" accord with "p1" to "p4", respectively, the number of comparing operations can be reduced if information about "p1" to "p4" is known, only by comparing "si+5" with pk (k<5) without the comparison between "si+2" and "p1". In this case, no buffer control is required because "si+1", "si+2", "si+3" and "si+4" of the character string S already compared require any comparison no longer. In this case, the function stipulating for the relation between "si+5" and "pk" is defined as the failure function F().

Definition 1: where a match pattern PAT of "p1, p2, p3, p4, ... pn" is given, the failure function F() for this pattern is defined as follows:

if "$p1, p2, p3, \ldots, pk$"="$pj-k+1, pj-k+2, \ldots$" (if $k \geq 1$) $F(j)=k$ otherwise $$F(j)=0 \qquad (3)$$

For example, if PAT="a,b,c,a,b,c,a,c,a,b", the following failure function can be obtained:

j:  12345678910
PAT: abcabcacab
F(j): 0001234012

Where pattern matching is failed, the location of a next comparing pattern can be obtained from the following equation (4) using the above failure function:

if j=1
Next Location (j)=0,
if j≠1, $$(j)=F(j1)+1 \qquad (4)$$

For example, it can be found that where the match pattern PAT is pattern matched with a next character string S of ". . . a,b,c,a,c,b,c,a,c,c,a,c,a,b, . . . ", "p5" (p5=b) does not accord with "si+5" (si+5=c). In this case, the location of the next comparing pattern can be derived from the above equation as follows:

$$F(5-1)+1=2$$

Accordingly, the number of comparing operations can be minimized by comparing "p2" (p5=b) and "si+5" (si+5=c) again without comparing the character string S from "si+2" thereof with "p1" of the match pattern PAT again.

Use of the failure function provides two advantages. The first advantage is that where the pattern matching is failed, the part of the character string S already compared is unnecessary to be compared. Accordingly, it is easy to control the buffer stored with the character string S. The second advantage is that the number of operations is minimized using the failure function.

Figure 1:
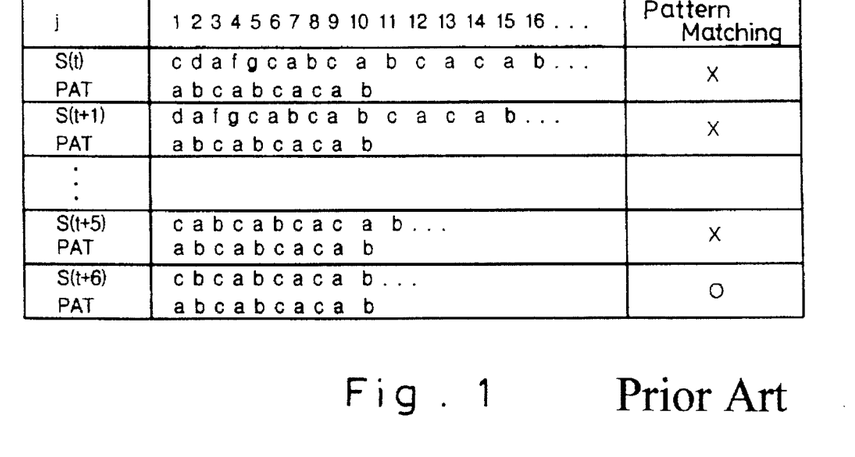
FIG. 1 is a diagram illustrating a conventional pattern matching algorithm for finding a synchronous signal from a variable length code bit string involving a transmission error.

Heretofore, the general sequential pattern matching algorithm and the sequential pattern matching algorithm using the failure function have been described. However, these algorithms are practically unsuitable for a direct application to systems requiring a high processing speed such as B-ISDN terminal, high definition TV and multimedia because its processing speed is low. Where such algorithms are realized in the form of hardware, it is possible to simultaneously compare "si+1, ... , si+n" with "p1, ... , pn" at one clock. Algorithms generally used utilize the sequential algorithm described in conjunction with Definition 1. In accordance with this method, the match pattern PAT of "p1, p2, ... , pn" are simultaneously compared with the character string S of "si+1, si+2, ... , si+n" to check the accord between the match pattern PAT and the character string S at one clock. If the match pattern PAT and the character string S do not accord with each other, the character string S is shifted one character. Thereafter, the match pattern PAT is compared with the character string S of "1+2, ... , i+n+1". If no accord is obtained between the match pattern PAT and the character string S, the above procedure is then repeated. This procedure is illustrated in FIG. 1. In this case, the number of total shirt times of the match pattern PAT for the comparison with the character string S is "L−n+1". Accordingly, the number of operations to be required is "(L−n+1)×n". The above algorithm enables the shift of one character for one clock.

As described above, the conventional method requires a lot of time to search for a synchronous code having a fixed length for a variable length code involving a transmission error. As a result, this method has a limitation on an application to systems requiring a high processing speed.

SUMMARY OF THE INVENTION

Therefore, an object of the invention is to provide a re-synchronization method for a desired synchronous code from a variable length code bit string involving a transmission error at a high speed in systems requiring a high processing speed such as B-ISDN terminal, high definition TV, multimedia and etc. to rapidly deal with the transmission error through the high speed re-synchronization.

In accordance with the present invention, this object can be accomplished by providing a method for finding a synchronous code to recover a bit string transmitted when a variable length code of the bit string involves a transmission error in a system requiring a high processing speed such as a broad band-integrated service digital network terminal, a high definition TV or multimedia, comprising the steps of: transmitting the bit string being inputted by the unit of n+1 bits to a program logic array; comparing the transmitted input bit string with each of synchronous code match patterns sequentially shifted one bit by one bit from the input bit string, in a parallel manner, to find a pattern matched with the synchronous code from the input bit string; if no pattern match has been found, transmitting an input bit string being subsequently inputted to the program logic array by the number of bits inputted at an accumulator until the pattern match is found, while if the pattern match has been found, sending a pattern find signal from the program logic array to a control unit and sending the number of pattern matched bits inputted at the accumulator; and shifting the input bit string by the number of pattern matched bits in a barrel shifter, whereby the synchronous code is accurately found from the input bit string with a variable length shift amount at a high speed.

BRIEF DESCRIPTION OF THE DRAWINGS

Other objects and aspects of the invention will become apparent from the following description of embodiments with reference to the accompanying drawings in which:

FIG. 4b is a diagram illustrating a pattern matching procedure carried out by the hardware of FIG. 4a;

FIG. 5b is a diagram illustrating a pattern matching procedure carried out by the hardware of FIG. 5a;

FIG. 7b is a diagram illustrating a pattern matching procedure carried out by the hardware of FIG. 7a.

DETAILED DESCRIPTION OF THE PREFERRED EMBODIMENTS

In accordance with the present invention, there are proposed two algorithms involving at least one shift for one clock by increasing the number of comparing operations being simultaneously processed.

First, a pattern matching involving a variable length shift will be described.

Let's assume that the pattern matching between a match pattern PAT and a character string S of "i+1, . . . , i+n" has been failed while "si+n−k+1" to "si+n" at the end of the character string S are identical to "p1" to "pk" of the match pattern PAT, respectively (k≦n). Since "p1, p2, . . . , pk" are identical to "si+n−k+1, . . . , si+n−1, si+n" respectively in this case, the match pattern PAT is then shifted on the character string S by "n−k". Thereafter, the character string S is compared with the match pattern PAT. This method enables the high speed processing because "si+1, si+2, . . . , si+n−k" of the character string S already compared are unnecessary to be compared again. In this case, the maximum value of k when the character string S of "si+n−k+1, . . . , si+n and the match pattern PAT of "p1, . . . , pk" are identical to each other, the shift amount of the match pattern PAT and the location of the match pattern PAT to be compared can be derived as follows.

If "p1, p2, p3, . . . , pk" are identical to "si+n−k+1, si+n−k+2, . . . , si+n" (0≦k≦n) under a condition of "pk+1"≠"si+n−k", the shift amount of the match pattern PAT at a next stage is "n−k". The location of the match pattern PAT to be compared at the next stage is "k+1". For example, where "p1, p2, p3, p4, . . . , pn" of the match pattern PAT correspond to "a, b, c, a, b, c, a, c, a, b" respectively (n=10) while ". . . , si+1, si+2, . . . , si+n, si+n+1, si+n+2, . . . " of the character string S correspond to " . . . , c, d, a, f, g, c, a, b, c, a, b, c, a, c, . . . " respectively, the shift amount of the match pattern PAT and the location of the next comparing pattern can be derived in a manner shown in FIG. 2. Since "p1, p2, p3, p4" are identical to "si+n−3, si+n−2, si+n−1, si+n" respectively in the above case, the value k is 4. In this case, the shift amount of the match pattern on the character string S is 6 (n−k=10−6=4).

Figure 2:
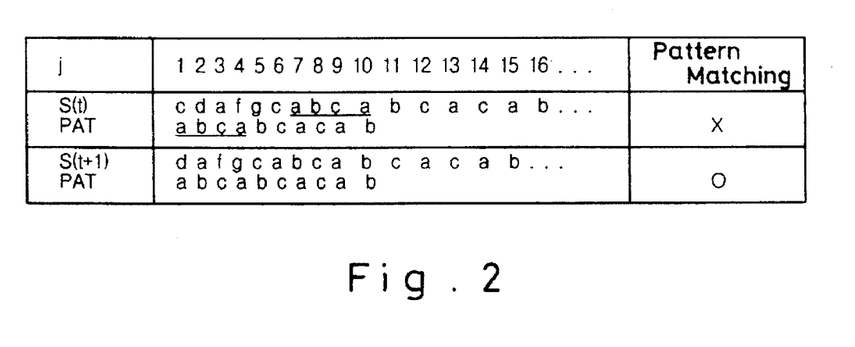
FIG. 2 is a diagram illustrating a pattern matching algorithm for finding a synchronous signal from a variable length code bit string involving a transmission error in accordance with a first embodiment of the present invention.

After being shifted by "6", the match pattern PAT advances to a next stage. Thereafter, "p5, p6, p7, p8, p9, p10" of the match pattern PAT are compared with "si+5, si+6, si+7, si+8, si+9, si+10" of the character string S, respectively. If the character string S has a random pattern characteristic, the value k approximates to zero. In this case, the total number of shift bits for the comparison between the character string S and the match pattern PAT is "L/n", while the number of operations required is "L/n×n", namely, "n". These values show that the pattern matching in accordance with the present invention is achieved at very high speed, as compared to the general pattern matching.

Secondarily, a pattern matching involving a fixed length shift in accordance with the present invention will be described.

Figure 3:
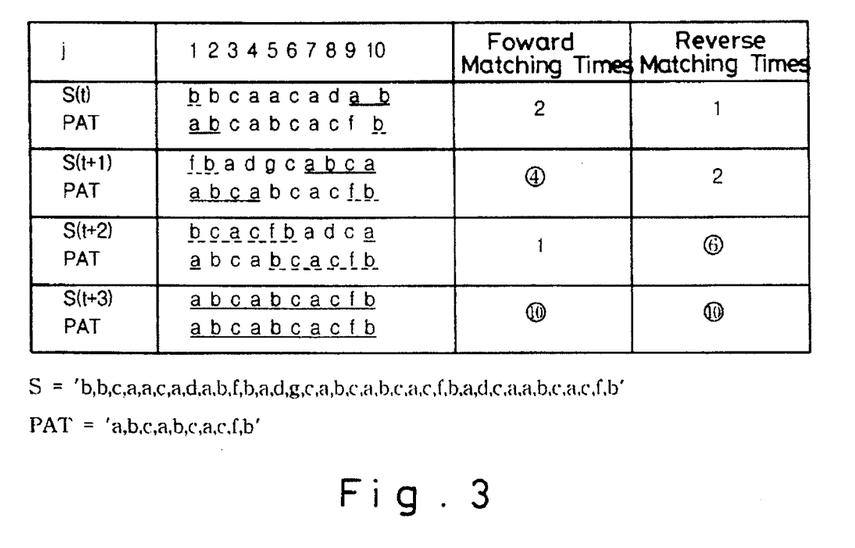
FIG. 3 is a diagram illustrating a pattern matching algorithm for finding a synchronous signal from a variable length code bit string involving a transmission error in accordance with a second embodiment of the present invention.

Let's indicate the current stage of the character string S being compared with the match pattern PAT as "S(t)" and the next stage of the character string S to be compared with the match pattern PAT after shifting the character string S as "S(t+1)", respectively. In this case, let's assume that the pattern matching between the match pattern PAT of "1, . . . , n" and the character string S of "t, 1, . . . , n" has been failed while "sn−k+1" to "sn" at the end of the character string S are identical to "p1" to "pk" of the match pattern PAT, respectively (k≦n). In this case, "p1, p2, . . . , pk" are identical to "sn−k+1, . . . , sn−1, sn", respectively. The value k is called "the number of forward matches". At the next stage, "pk+1, . . . , pn" of the match pattern PAT are compared with "t+1, . . . , n" of the character string S, respectively. When "pk+1, pk+2, . . . , pn" are identical to "s1, s2, . . . , snk" respectively in this case, a desired pattern can be found. This procedure will now be described in conjunction with FIG. 3. Let's assume that the match pattern PAT has "a, b, c, a, b, c, a, c, f, b" (n=10) while the character string S to be compared has "b, b, c, a, a, c, a, d, a, b, f, b, a, d, g, c, a, b, c, a, b, c, a, c, f, b, a, d, c, a, a, b, c, a, b, c, a, c, f, b". Where every 10-character of the character string S is to be compared with the match pattern PAT, the character string S is divided into the following character strings to be compared with the match pattern PAT:

S(t)="b, b, c, a, a, c, a, d, a, b"

S(t+1)="f, b, a, d, g, c, a, b, c, a"

S(t+2)="b, c, a, c, f, b, a, d, c, a"

S(t+3)="a, b, c, a, b, c, a, c, f, b"

Where the first character string S(t) is forwardly compared with the match pattern PAT from the first character of the match pattern PAT, the number of forward matches is 2 (k=2) because " . . . , a, b" of the character string S(t) are identical to "a, b, . . . " of the match pattern PAT. Where the next character string S(t+1) is then backwardly compared with the match pattern PAT from the last character of the match pattern PAT, the number of backward matches is 2

(k=2) because "f, b, ... " of the character string S(t+1) are identical to "... f, b" of the match pattern PAT. Since the sum of the number of forward matches and the number of backward matches does not correspond to "10", it is regarded that no pattern matching has been achieved. Where the character string S(t+1) is forwardly compared with the match pattern PAT, the number of forward matches is 4 (k=4) because "... , a, b, c, a" of the character string S(t+1) are identical to "a, b, c, a, ... " of the match pattern PAT. Where the character string S(t+2) is backwardly compared with the match pattern PAT, the number of backward matches is 6 (k=6) because "b, c, a, c, f, b, ... " of the character string S(t+2) are identical to " ... , b, c, a, c, f, b" of the match pattern PAT. In this case, the sum of the number of forward matches and the number of backward matches corresponds to "10". Accordingly, it can be found that a desired character string is present in the character strings S(t+10) and S(t+2). Where the character string S(t+2) is forwardly compared with the match pattern PAT, the number of forward matches is 1 (k=1) because " ... , a" of the character string S(t+2) is identical to "a, ... " of the match pattern PAT. Since the number of matches between the character string S(t+3) and the match pattern PAT is 10 (k=10) as all characters of the character string S(t+3) are identical to all characters of the match pattern PAT, respectively, the pattern match is achieved respective of the number of previous forward matches. In this case, the total number of shift bits required to compare the character string S with the match pattern PAT is "L/n" while the number of operations required is "L/n×n=L".

Now, a parallel-processing pattern matching will be described.

Let's assume that the match pattern PAT has the length of n bits while the character string to be compared with the match pattern PAT is an input bit string S(t) hardwarily given and having the length of d bits (n≦d). Two parallel-processing pattern algorithms may be used for this case.

First, the parallel processing of the match pattern PAT means that where the match pattern PAT has "pat1+pat2+ . . . +pati+ . . . , patk" (the length of "pati" is "p"), "pati" is independently found from the input bit string S(t). If the value k is 1, the minimum comparison amount required for the maximum shift amount for the given input bit string S(t) is identical to that in the case where no parallel matching is achieved.

Second, the parallel processing of the input bit string S(t) is the algorithm for finding "patt" by parallel matching "patt" with respective dj bits where the input bit string S(t) has the length of d [d=d1+d2 ... +dj (d1=d2= ... dj=n)]. This case corresponds to the case wherein "patt" having the interval of p (p=n) is found in a parallel manner from the input bit string having the length of n (n=d). Therefore, the number of operations C required to obtain the total shift amount d can be expressed by the following equation:

$$C = \frac{1}{2} \times n \times (n+1) \times d/n + (\frac{1}{2}) \times (n-1) \times (n-1) \times (d/n-1)$$

Let's consider the optimum hardware for achieving the parallel pattern matching on the basis of the minimum number of comparing operations for the above-mentioned parallel-processing pattern matching.

First, the shift amount of the match pattern PAT at one stage should be maximized. To this end, it is required to maximize the length of the input bit string S(t) to be compared with the match pattern PAT. Even if a continued increase in the length of the input bit string S(t) maximizes the shift amount of the match pattern PAT at one stage, it results in a time delay of the execution of one stage.

Second, the time taken for the execution of one stage should be minimized. This means that the critical path should be reduced as much as possible by minimizing the delay of a signal by gates. The time delay at one stage is determined depending on the number of gates through which the signal passes. A signal indicative of the match pattern is derived from the input bit string S(t). From the derived match pattern, the shift amount is then derived. In the procedure of deriving the shift amount, the minimum shift amount has the priority. As the length d of the input bit string S(t) is larger, a lengthened delay of gate occurs. This is because after processing the shift amount of the higher priority, the shift amount of the lower priority should be determined. In order to minimize such a delay of gate, the length d should be reduced as much as possible. Meanwhile, the match pattern PAT and the input bit string S(t) being compared with each other should have the same length in order to minimize the time required to process one stage.

Finally, the complexity of logic should be minimized. The number of comparing operations C required to compare the match pattern PAT with the input bit string S(t) is "n". This case corresponds to the case wherein the binary bit string of the match pattern PAT is constituted entirely by 0's or entirely by 1's. Generally, the match pattern PAT of synchronous codes used in high definition TVs is constituted by continuous bits of "0".

The above three requirements can be satisfied by constituting the match pattern PAT by the same codes and maximizing the length of the input bit string S(t) to be compared with the match pattern PAT while minimizing the length of the input bit string S(t) to minimize the delay of gate. Accordingly, these three requirements can be satisfied by constituting the input bit string S(t) by "s1+s2+ ... +si+ ... +sk" (the length of "si" is "n") and then comparing "si" with the match pattern PAT through the parallel processing. As a circuit is constructed in the above-mentioned manner, the number of comparing operations can be increased to "0(n)". In this case, the critical path is increased to "0(1)" while the maximum shift amount of the match pattern PAT is increased to "0(n)". Accordingly, the pattern finding speed can be greatly increased to "0(n)" by increasing the complexity of the circuit as the function of 0(n) while minimizing the time taken for one stage in the system for finding synchronous codes. For example, where the match pattern PAT has the length of 10 bits while the input bit string S(t) has the length of 50 bits, it is optimum to divide the input bit string S(t) into five equal parts having the length of 10 bits and then compare the equal parts of the input bit string S(t) with the match pattern PAT through the parallel operation, respectively. Where the match pattern PAT can be optionally defined, it is possible to minimize by constituting the input bit string S(t) entirely by bits of "0" or by bits of "1".

Figure 4A:
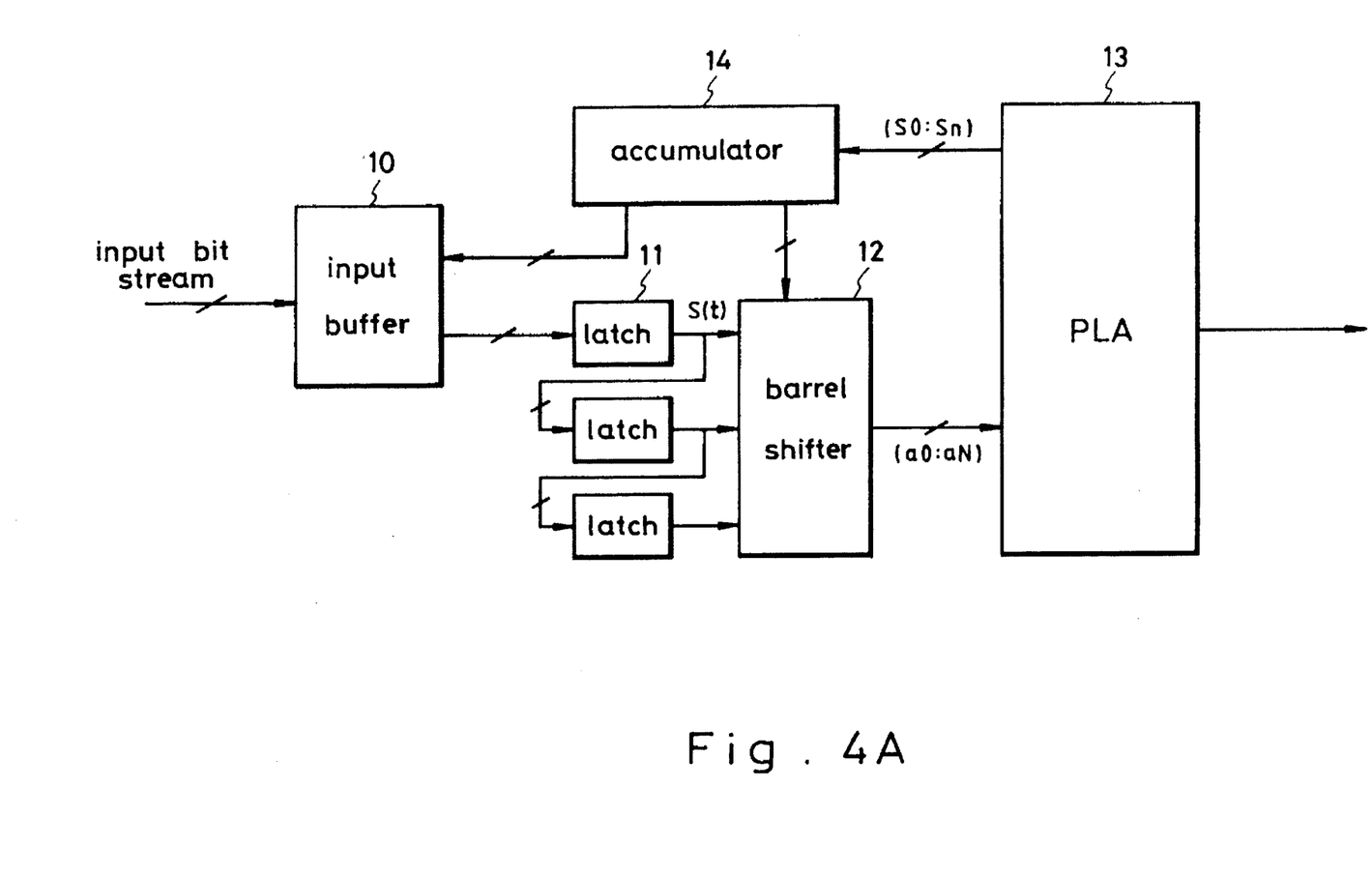
FIG. 4a is a block diagram illustrating a hardware realizing the pattern matching algorithm for finding a synchronous signal from a variable length code bit string involving a transmission error in accordance with the first embodiment of the present invention.

Referring to FIG. 4a, there is illustrated a hardware having a variable length shift amount for finding a synchronous code from a variable length code bit string involving a transmission error in accordance with a first embodiment of the present invention. As shown in FIG. 4a, the hardware includes an input buffer 10 for receiving an input bit string. A barrel shifter 12 is coupled to the input buffer 10 via a latch 11. Coupled to the barrel shifter 12 is a program logic array (PLA) 13. The PLA 13 is connected to the input buffer 10 via an accumulator 14 which is connected to the barrel shifter 12. The barrel shifter 12 is used to provide a variable length shift amount. The latch 11 is stored with the input bit string. The barrel shifter 12 serves to output a bit string shifted from the current input hit string. The PLA 13 calculates the shift amount of the current input bit string at a next stage. The PLA 13 also outputs a matching signal indicative of whether the match pattern has been matched with a desired character string. When the pattern matching is failed, the accumulator 14 stores the shift amount of the input hit string at the next stage. Where the shift amount stored in the accumulator 14 is larger than that of the barrel shifter 12, the accumulator 14 also serves to send a corresponding signal so that an input bit string at the next stage can be inputted.

In other words, the current input bit string having 0 to N bit strings is sent to the PLA via the barrel shifter. The PLA compares the received input bit string with each of synchronous code match patterns sequentially shifted one bit by one bit from the input bit string, in a parallel manner, to determine whether the input bit string is identical to the match pattern. Where the input bit string does not accord with the match pattern, a next input bit string is inputted at the PLA. The comparison procedure is repeated until the input bit string is identical to the match pattern. When the input bit string is identical to the match pattern, the current input bit string and the next input bit string are shifted by the number of matched bit strings. The shifted input bit strings are then outputted from the PLA to find a correct synchronous signal.

For more easy understanding of the algorithm realizing the hardware for the high speed re-synchronization, the match patterning procedure will be described in conjunction with FIG. 4b. Where the match pattern has the length of 5 bits, "00111" while the input bit string to be compared with the match pattern has the length of 10 bits, the match pattern is compared with logics sequentially shifted one bit by one bit from the input bit string in a simultaneous manner through the parallel processing. By the comparison, the minimum number of pattern matches with the input bit string, namely, the value mk is derived. Since the value k is used as the input value of the barrel shifter in this case, the input bit string is shifted by "k" at the next stage. The shifted input bit string is then compared with the match pattern of "00111". In this case, the maximum bit shift amount of the input bit string at the next stage is not dependent on the length of the match pattern, namely, 5 bits, but dependent on both the number of bits of the input bit string being compared and the maximum number of shiftable bits of the barrel shifter. If it is assumed that the input bit string has 10 bits while the barrel shifter has at least 10 shiftable bits, the maximum shift amount of the match pattern is 10.

The above algorithm has the condition that the match pattern should be freely shiftable by a desired length of 0 to n bits with respect to the character string S. Where the algorithm is hardwarily realized, however, a barrel shifter for freely adjusting the shift amount of the match pattern is required. This results in the complexity of hardware.

Therefore, a method for fixing the shift amount of the match pattern PAT to "n" when the match pattern PAT is found from the character string S will now be described.

Figure 5A:
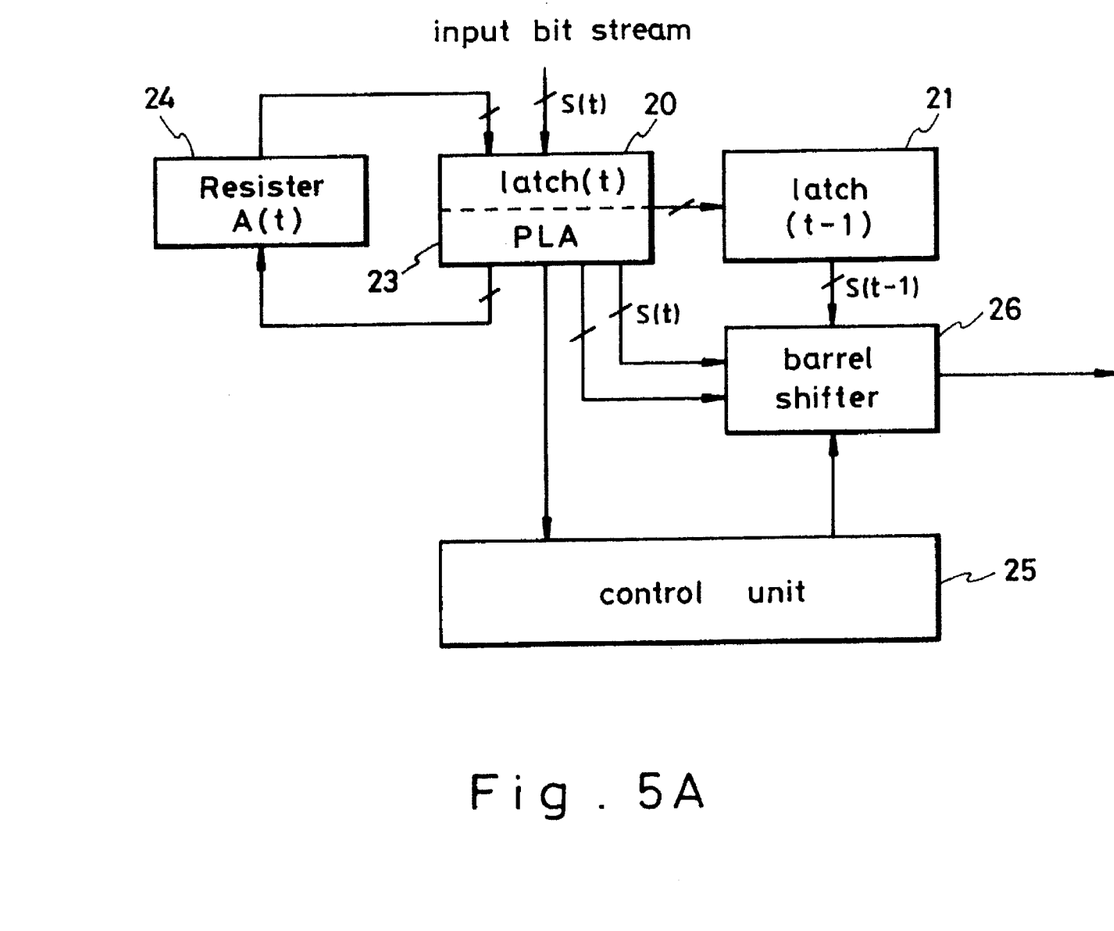
FIG. 5a is a block diagram illustrating a hardware realizing the pattern matching algorithm for finding a synchronous signal from a variable length code bit string involving a transmission error in accordance with the second embodiment of the present invention.

Referring to FIG. 5a, there is illustrated a hardware having a fixed length shift amount for finding a synchronous code from a variable length code bit string involving a transmission error in accordance with a second embodiment of the present invention. In order to have the fixed length shift amount, the hardware includes latches 20 and 21 and a register 24. The latch 20 is stored with a current input bit string having 0 to N bits. The hardware also includes a PLA 23, a control unit 25 connected to the PLA 23 and a barrel shifter 26 connected to both the PLA 23 and the control unit 25. The PLA 23 compares the current input bit string stored in the latch 20 with each of synchronous code match patterns sequentially shifted one bit by one bit from the input bit string toward subsequent bits, in a parallel manner, to determine whether the input bit string is identical to the match pattern and thereby to determine the number of matches, namely, forward matches. The PLA 23 also compares the current input bit string stored in the latch 20 with each of synchronous code match patterns sequentially shifted one bit by one bit from the input bit string toward preceding bits, in a parallel manner, to determine whether the input bit string is identical to the match pattern and thereby to determine the number of matches, namely, backward matches. The number of forward matches and the numbers of backward matches are stored in the register 24. Thereafter, an input bit string at a next stage is inputted at the latch 21. At this time, the input bit string at the current stage is sent to the latch 21. Based on the input bit string at the next stage, the number of forward matches and the number of backward matches at the next stage are determined in the PLA in the above-mentioned manner. Where the sum of the number of forward matches at the current stage and the number of backward matches at the next stage is identical to the number of N bits of the input bit string, the PLA sends a pattern find signal to the control unit 25 and the number of bits to be shifted to the barrel shifter 26. On the basis of the number of bits to be shifted, the barrel shifter 26 acts to shift the input bit string at the current stage from the input bit string at the next stage so that the current input bit string is matched with the synchronous code match pattern.

Figure 5B:
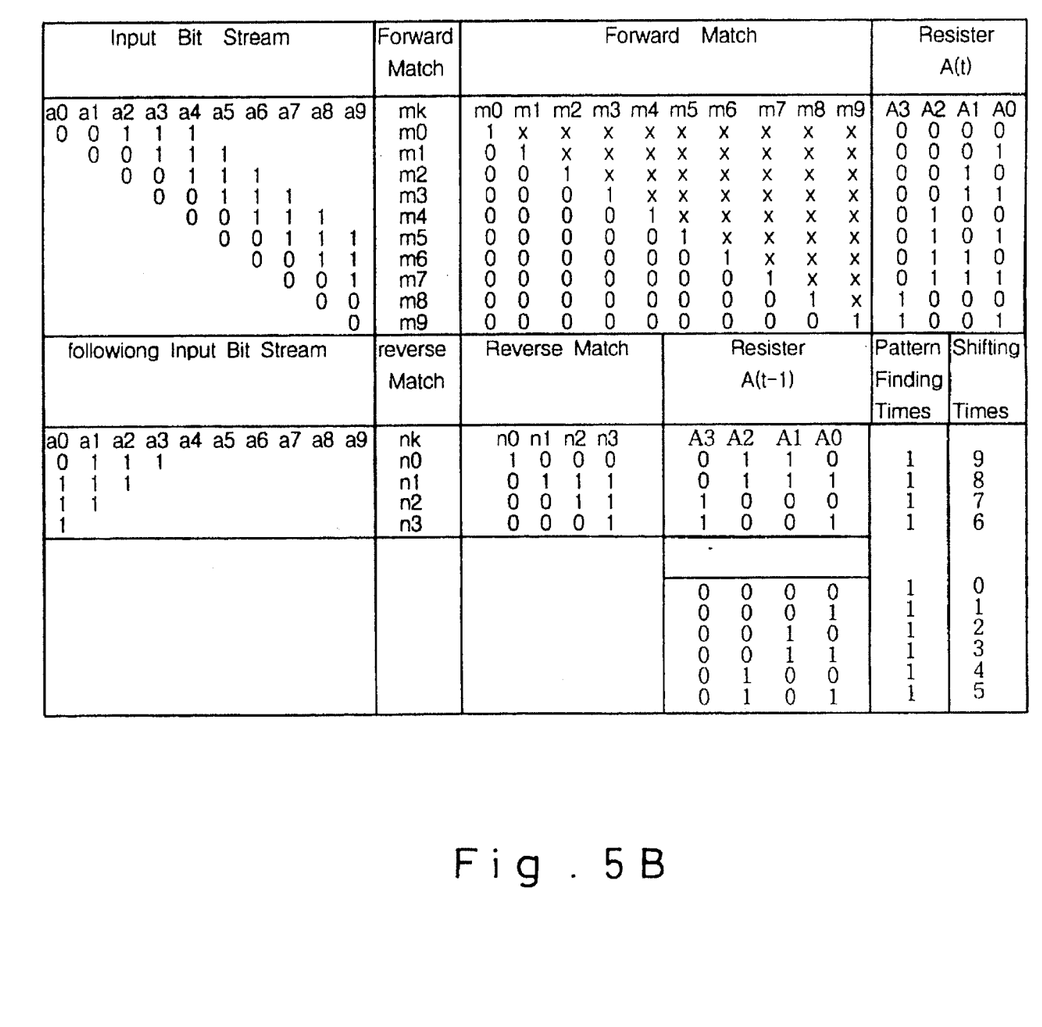

For more easy understanding of this algorithm realizing the hardware for the high speed re-synchronization, the match patterning procedure will be described in conjunction with FIG. 5b showing the procedure of designing the hardware using the register. Where the match pattern has the length of 5 bits, "00111" while the input bit string to be compared with the match pattern has the fixed length of 10 bits, a check is made about whether a desired pattern is present, on the basis of the number of forward pattern matches of the current input bit string and the number of forward pattern matches of the previous input bit string. The number of forward matches is dependent on the fixed length of the input bit string whereas the number of backward matches is dependent on the length of the match pattern.

In accordance with a third embodiment of the present invention, there is proposed a parallel-processing hardware having a fixed length shift amount for finding a synchronous code from a variable length code bit erring involving a transmission error.

As described in conjunction with the hardware having the fixed length shift amount, the length of the input bit string S(t) to be compared with the match pattern PAT should be maximized in order to rapidly find the desired match pattern PAT from the input bit string. Meanwhile, the length of the input bit string S(t) should be minimized in order to minimize the delay of gate. These requirements can be satisfied by constituting the input bit string S(t) by "s1+s2 ... +si+ ... +sk" (the length of "si" is "n") and then comparing "si" with the match pattern PAT through the parallel processing.

Figure 6:
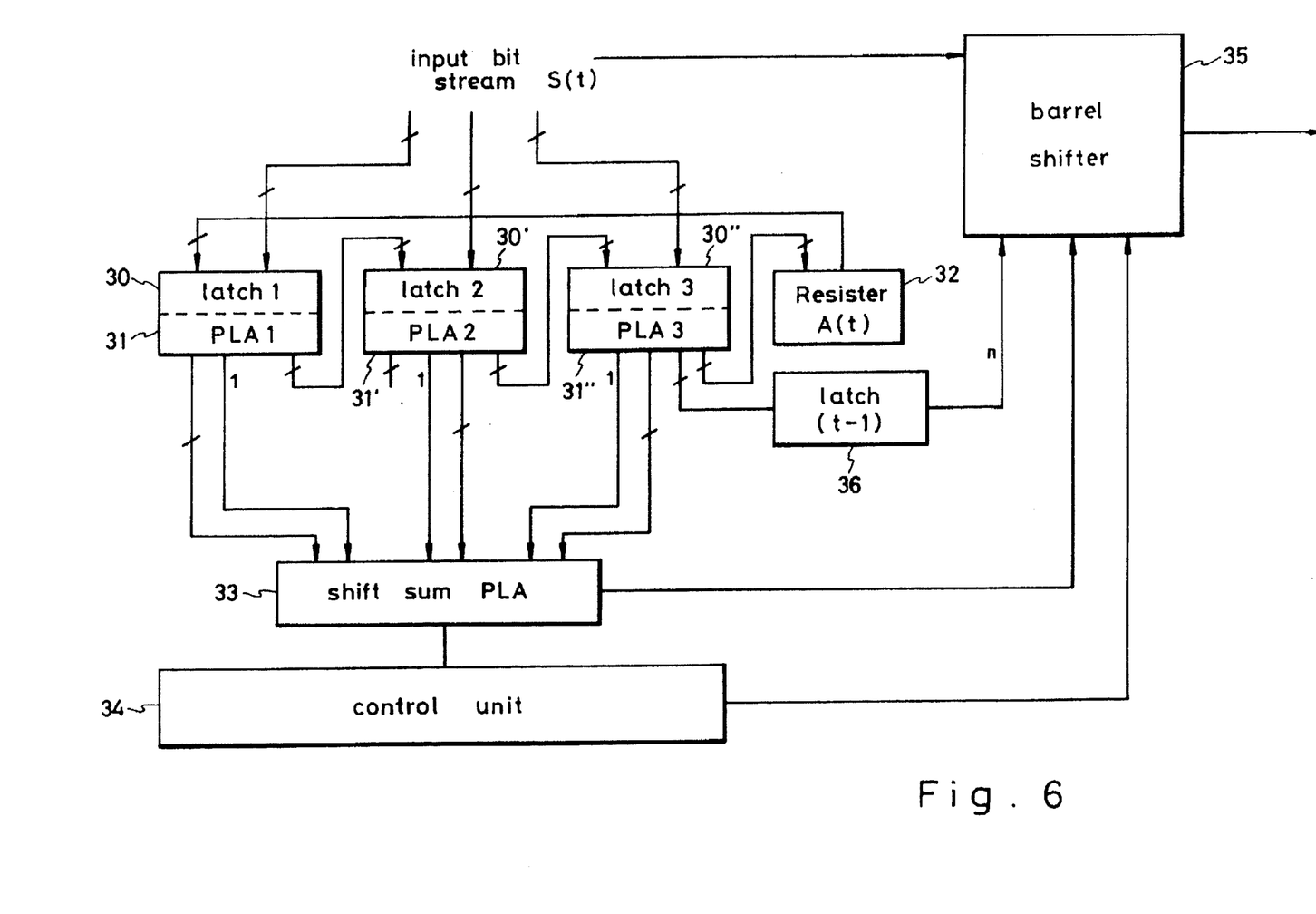
FIG. 6 is a block diagram illustrating a hardware realizing the pattern matching algorithm for finding a synchronous signal from a variable length code bit string involving a transmission error at a high speed in accordance with a third embodiment of the present invention.

FIG. 6 shows a block diagram of a parallel-processing pattern matching hardware in the case of d=3n, where "d" represents the length of the input bit string S(t) while "n" represents the length of the match pattern PAT. As shown in FIG. 6, the input bit string is inputted at three latches 30, 30' and 30" and three PLA 31, 31' and 31" in a sequential manner. The PLA 31, 31' and 31" carries out a pattern processing in a manner similar to that of the method for processing the pattern having the fixed length shift amount. The first PLA 31 serves to add the number of backward matches of the current input bit string to the number of forward matches of the previous input bit string and then check whereby the resultant value corresponds to the number of bits of the match pattern. The second PLA 31' serves to add the number of forward matches outputted from the first PLA 31 to the number of backward matches of the input bit string and then check whether the resultant value corresponds to the number of bits of the match pattern. On the other hand, the third PLA 31" serves to add the number of forward matches outputted from the first PEA 31 and the number of forward matches outputted from the second PLA 31' to the number of backward matches of the input bit string and then check whether the resultant value corresponds to the number of bits of the match pattern. The number of forward matches outputted from the third PLA 31" is stored in the register 32. The number of forward matches stored in the register 32 is then outputted at the first PLA 31 so that it is associated with an input bit string to be subsequently inputted. In other words, the pattern matching processing of the PLAs 31, 31' and 31" are the same as that of the case of FIG. S for processing the pattern having the fixed length where they are regarded as a single PLA. The hardware of FIG. 6 includes a shift sum PLA 33 for receiving pattern find signals and numbers of bits to be shifted from the PLAs 31, 31' and 31". Connected to the shift sum PLA 33 are a control unit 34 and a barrel shifter 35. The barrel shifter 35 serves to shift the input bit string from the previous input bit string outputted from a latch 36 connected to the third PLA 31" by the number of required shift bits outputted from the shift sum PLA 33. The location of the pattern to be found is determined by the pattern find signal outputted from each latch. To this end, the PLAs are adapted to calculate pattern find signals respectively outputted from the corresponding latches. The calculation results outputted from the PLAs is sent to the control unit. The number of forward matches of the input bit string S(t) at the last latch is stored in the register which, in turn, compares the stored number of forward matches with the number of first reaching input bits of a next input bit string S(t+1) to determine whether the pattern matching is obtained. The comparison result from the register is then sent to the control unit. The hardware of FIG. 6 is very useful to find a desire pattern at a high speed where the length L of the input bit string S is very longer than the length n of the match pattern PAT (L>n) and where the probability of the match pattern PAT to be present in the input bit string is very low. In similar to the afore-mentioned algorithm, this algorithm enables the number of comparing operations to be increased to "0(n)". In this case, the critical path is also increased to "0(1)" while the maximum shift amount of the match pattern PAT is increased to "0(n)". The complexity of the circuit is increased to 0(n). Accordingly, the pattern finding speed can be greatly increased to "0(n)" by increasing the complexity of the circuit as the function of 0(n) while minimizing the time taken for one stage in the system for finding synchronous codes as in high definition TVs.

Figure 7A:
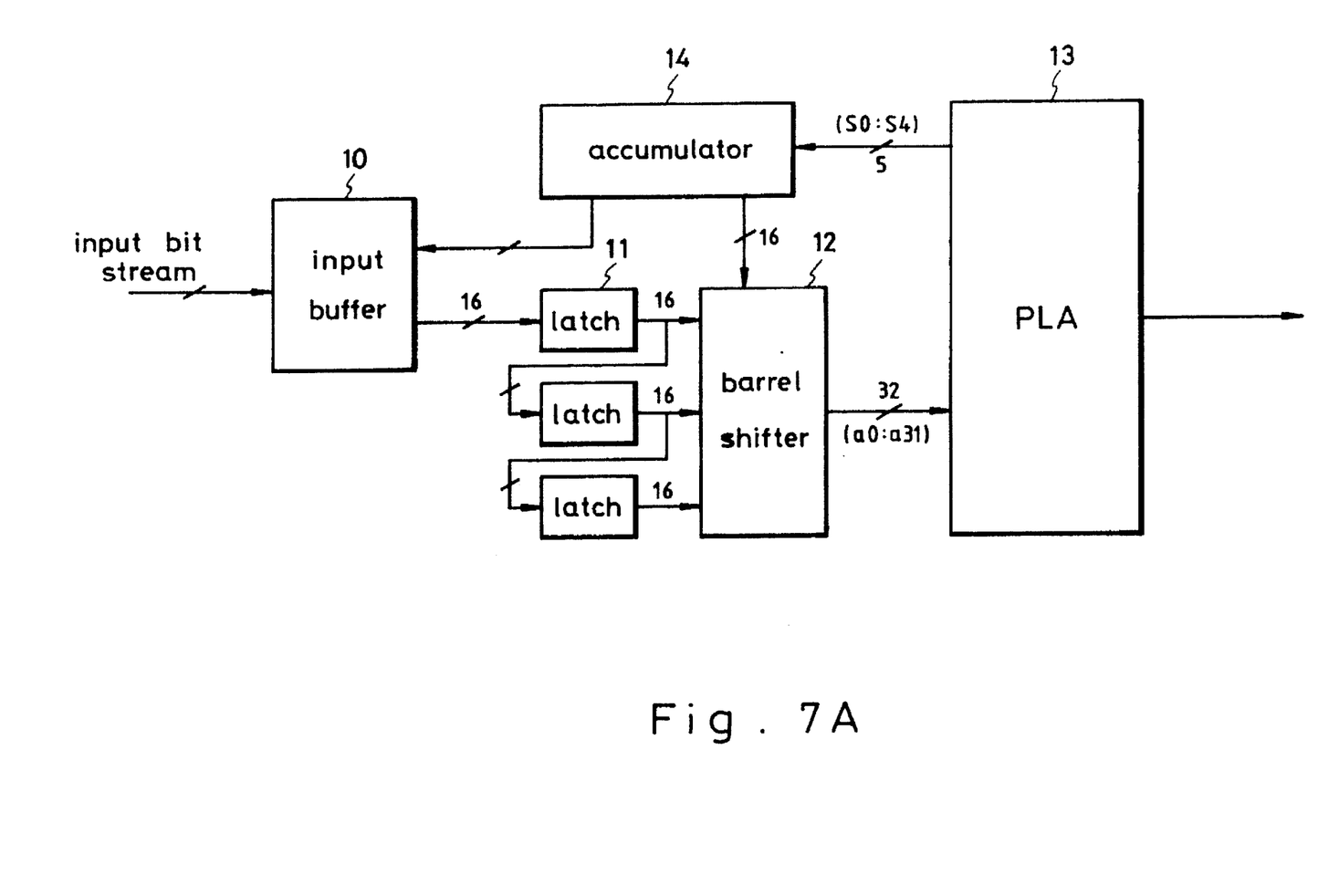
FIG. 7a is a block diagram illustrating the hardware of the first embodiment of the present invention applied to a variable length decoder of a high definition TV.
Figure 7B:
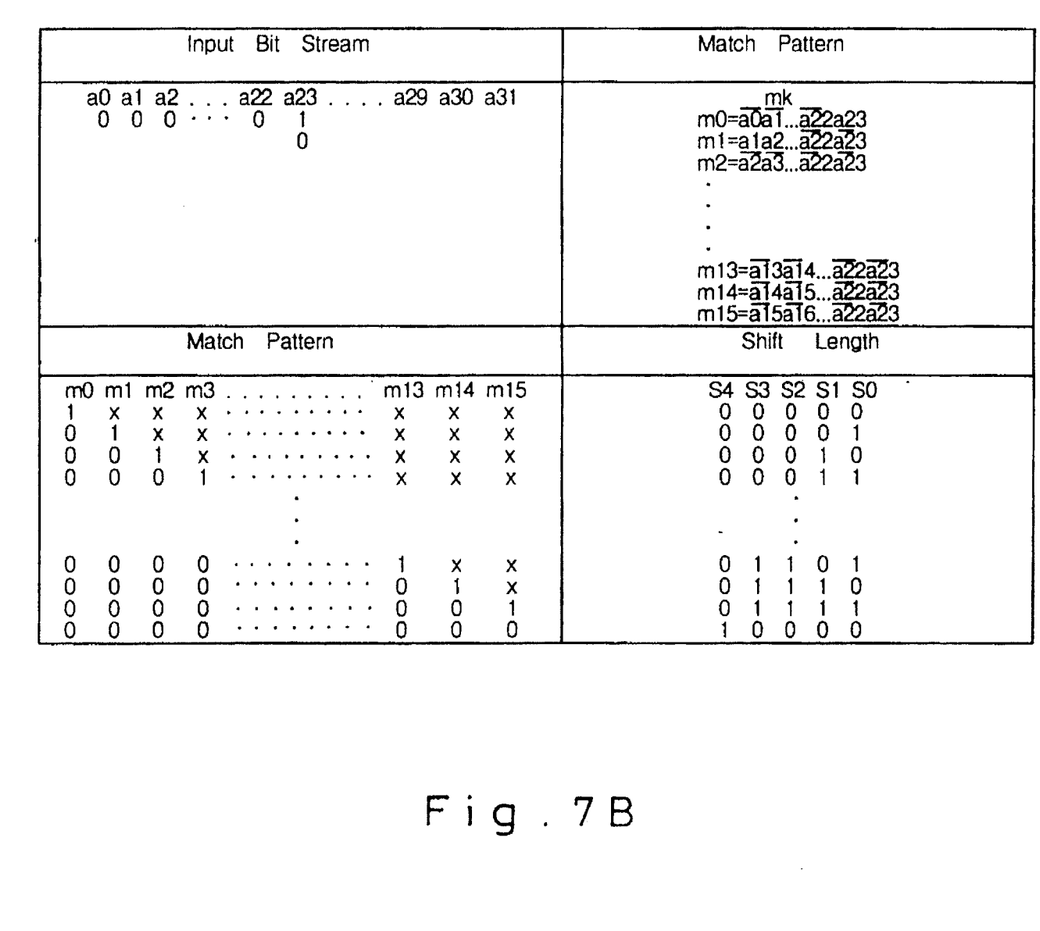

Now, the case wherein the above algorithm is applied to a bit string decoder of a high definition TV will be described. As the bit string decoder of high definition TV, there has been known a variable length decoder having functions of checking bit strings, searching for synchronous codes, decoding fixed length codes and decoding various variable length codes. Generally, the hardware shown in FIG. 7a is commonly used as the bit string decoder. As shown in FIG. 7a, the hardware has the same construction as that shown in FIG. 4a. The latch 11 is stored with a bit string to be decoded. The barrel shifter 12 serves to output a bit string to be currently decoded. The PLA 13 outputs the code length of a symbol currently decoded, the value of the decoded symbol, and a pattern find signal indicative of match and mismatch of synchronous code and indicative of whether a variable length code is matched with a codebook. The accumulator 14 accumulates the code length of the decoded symbol so that the barrel shifter 12 can determine the shift amount at a next stage.

Where the variable length code outputted from the PLA does not accord with the code stored in the codebook due to a transmission error involved in the input bit string, a matching signal of 0-value is outputted. The control sequence unit operates in a mode for searching for synchronous codes. The search for the synchronous pattern is carried out using the above-mentioned synchronous pattern searching algorithm. The high definition TV compression algorithm using a Moving Picture Experts Group (MPEG) algorithm as a basic algorithm use 24 bits as the synchronous code. The first bit to 23th bit of the synchronous code are "0" while the 24th bit is "1". That is, the "0" bits, namely, forward 23 bits constitute a bit string having the "1" bit as its interval bit. If only the "1" bit is detected to search fox a re-synchronization code in this case, one logic for distinguishing "1" and "0" is also needed. Where the barrel shifter (48 bit input and 32 bit output) has the maximum shift amount of 16 bits, the maximum shift amount of the input bit string is 16 bits. The pattern match output value and the input value of the barrel shifter in this case are shown in FIG. 7b. When a logic realized as shown in FIG. 7b is incorporated in the PLA of the variable length decoder shown in FIG. 7a, a high speed re-synchronization can be achieved.

Figure 8:
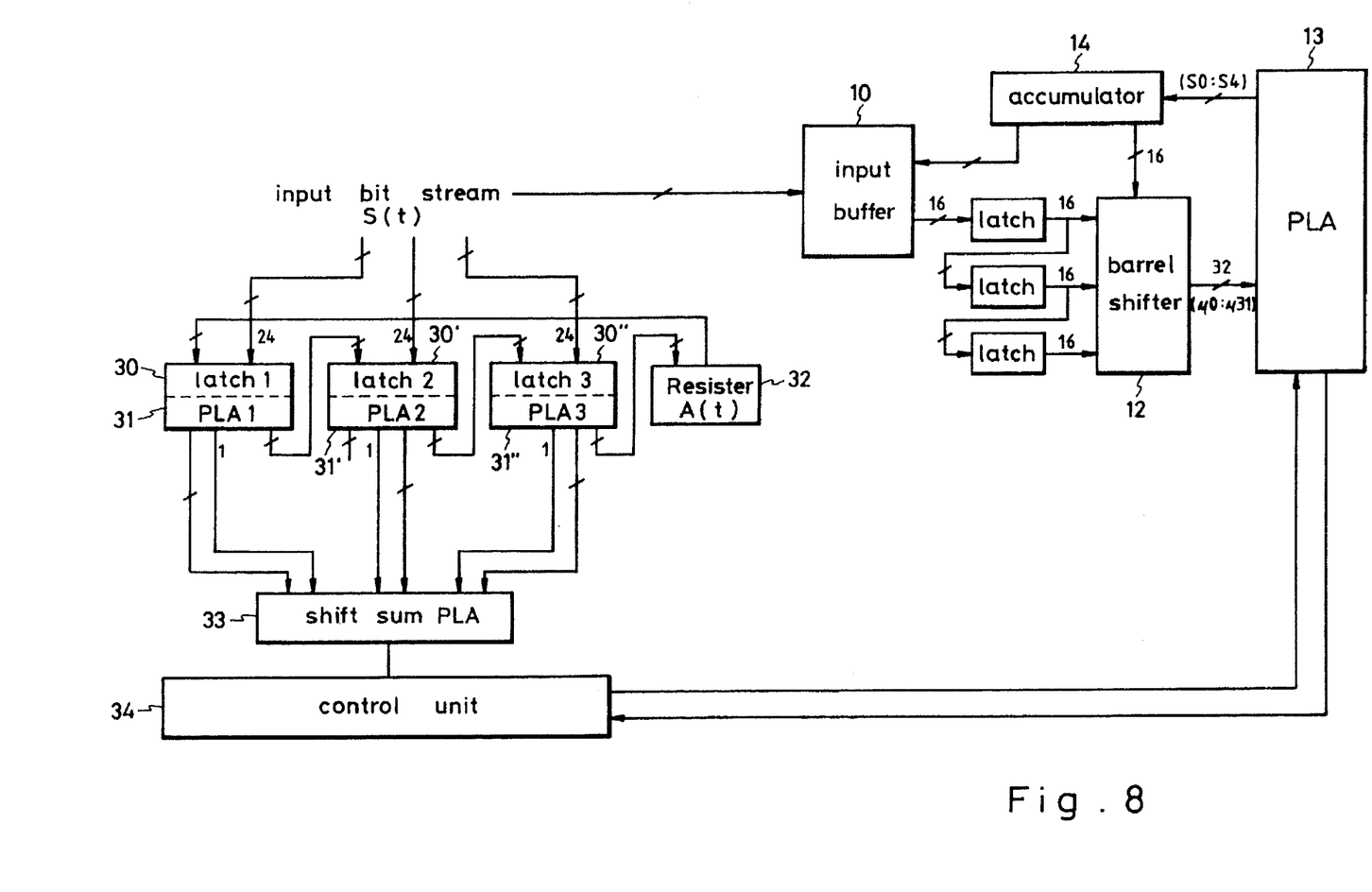
FIG. 8 is a block diagram illustrating the hardware of the third embodiment of the present invention applied to a variable length decoder of a high definition TV.

The above case illustrates the re-synchronization algorithm with the variable length shift amount for finding the re-synchronization using the variable length decoder. Other re-synchronization algorithm using the parallel-processing pattern matching without using the variable length decoder may be considered. In accordance with this algorithm, the re-synchronization code is found at a high speed externally of the variable length decoder and then sent to the variable length decoder. The hardware used in this case is the same as that shown in FIG. 6. The PLA is constructed by adding the number of forward matches to the hardware using the variable length decoder. FIG. 8 shows a system constituted by applying such an algorithm to a high definition TV. Assuming that the case of FIG. 8 utilizes an algorithm based on the MPEG, the length of the re-synchronizing signal is 24 bits. In this case, the input of each latch is fixed to 24 bits. The length of the input bit string S(t) is 72 bits, 3 times the length of latch. When a match pattern is found, it is needed to calculate the shift amount of the match pattern and send the calculated shift amount to the variable length decoder. To this end, the shift sum PLA is used. The control unit controls the variable length decoder to receive an input bit string from the input buffer again. The control unit informs the variable length decoder of the location of the decoding- starting bit on the basis of the information from the register so as to achieve the re-synchronization.

As apparent from the above description, the present invention realizes a high speed algorithm together with the development of VLSI technology. Realization of such a high speed algorithm was not expected in the past.

Since the method of the present invention can be applied to all systems using various digital signals requiring a high computation processing, such as high definition TV, B-ISDN terminal and multimedia, various effects and advantages are expected.

Although the preferred embodiments of the invention have been disclosed for illustrative purposes, those skilled in the art will appreciate that various modifications, additions and substitutions ace possible, without departing from the scope and spirit of the invention is disclosed in the accompanying claims.

What is claimed is:

1. A method for finding a synchronous code to recover a bit string transmitted when a variable length code of the bit string involves a transmission error in a system requiring a high processing speed such as a broad band-integrated service digital network terminal, a high definition TV or multimedia, comprising the steps of:

transmitting the bit string being inputted by the unit of n+1 bits to a program logic array;

comparing the transmitted input bit string with each of synchronous code match patterns sequentially shifted one bit by one bit from the input bit string, in a parallel manner, to find a pattern matched with the synchronous code from the input bit string;

if no pattern match has been found, transmitting an input bit string being subsequently inputted to the program logic array by the number of bits inputted at an accumulator until the pattern match is found, while if the pattern match has been found, sending a pattern find signal from the program logic array to a control unit and sending the number of pattern matched bins inputted at the accumulator; and shifting the input bit string by the number of pattern matched bits in a barrel shifter, whereby the synchronous code is accurately found from the input bit string with a variable length shift amount at a high speed.

2. A method for finding a synchronous code to recover a bit string transmitted when a variable length code of the bit string involves a transmission error in a system requiring a high processing speed such as a broad band integrated service digital network terminal, a high definition TV or multimedia, comprising the steps of:

transmitting a unit bit string having n+1 bits to a program logic array, comparing the input bit string with each of synchronous code match patterns sequentially shifted one bit by one bit from the input bit string in a forward direction, in a parallel manner, to find a location matched with the synchronous code from the input bit string, storing the number of forward matches in a register, comparing the input bit string with each of synchronous code match patterns sequentially shifted one bit by one bit from the input bit string in a backward direction, in a parallel manner, to determine the number of backward matches, and checking whether the sum of the number of backward matches and the number of forward matches stored in the register is identical to the number of bits of the synchronous code pattern;

if the sum is different from the number of bits of the synchronous code pattern, transmitting a next unit input bit string to the program logic array and repeating the above steps until the sum is identical to the number of bits of the synchronous code pattern;

if the sum is identical to the number of bits of the synchronous code pattern, sending a pattern find signal to a control unit and sending the number of shift bits to a barrel shifter; and inputting a previous unit input bit string and the current unit input bit string at the barrel shifter to that the inputted input bit strings are shifted by the number of shift bits in a barrel shifter, whereby the synchronous code is accurately found from the input bit string with a fixed length shift amount at a high speed.

3. A method in accordance with claim 2, wherein the number of forward matches is determined by comparing the input bit string respectively with N+1 synchronous code patterns in a parallel manner and detecting the number of bits of a portion of the input bit string partially matched with the synchronous code patterns at least.

4. A method in accordance with claim 2, wherein the number of backward matches is determined by comparing the input bit string respectively with a plurality of synchronous code patterns sequentially shifted one bit by one bit in a backward direction, in a parallel manner, and detecting the number of bits of a portion of the input bit string partially matched with the synchronous code patterns at least.

5. A method in accordance with claim 2, wherein the step of shifting the inputted input bit strings by the number of shift bits in the barrel shifter is executed in response to a control signal from the control unit.

6. A method for finding a synchronous code to recover a bit string transmitted when a variable length code of the bit string involves a transmission error in a system requiring a high processing speed such as a broad band-integrated service digital network terminal, a high definition TV or multimedia, comprising the steps of:

sequentially receiving a plurality of unit input bit strings each having a fixed length to find the synchronous code from the input bit string having a shift amount corresponding the fixed length;

summing the number of forward matches of a synchronous code pattern with a current unit input bit string and the number of backward matches of the synchronous code pattern with a previous unit input bit string just preceding to the current unit input bit string, and checking whether the resultant sum is identical to the number of bits of the synchronous code pattern;

if the sum is different from the number of bits of the synchronous code pattern, receiving a plurality of next unit input bit strings and repeating the above steps until the sum is identical to the number of bits of the synchronous code pattern;

if the sum is identical to the number of bits of the synchronous code pattern, totally sending pattern find signals to a control unit and sending the number of shift bits to a barrel shifter; and inputting the last one of previous unit input bit strings and the current unit input bit strings at the barrel shifter so that the inputted input bit strings are shifted by the number of shift bits in a barrel shifter, whereby the synchronous code is accurately found from the input bit string with a fixed length shift amount at a high speed.

7. A method in accordance with claim 6, wherein the number of forward matches is determined by comparing the input bit string respectively with a plurality of synchronous code patterns sequentially shifted one bit by one bit in a forward direction, in a parallel manner, and detecting the number of bits of a portion of the input bit string partially matched with the synchronous code patterns at least.

8. A method in accordance with claim 6, wherein the number of backward matches is determined by comparing the input bit string respectively with a plurality of synchronous code patterns sequentially shifted one bit by one bit in a backward direction, in a parallel manner, and detecting the number of bits of a portion of the input bit string partially matched with the synchronous code patterns at least.

* * * * *